United States Patent [19]

Tall

[11] Patent Number: 5,458,945
[45] Date of Patent: Oct. 17, 1995

[54] REMOVABLE PROTECTIVE COVER FOR A SNOWMOBILE

[76] Inventor: Patrick Tall, P.O. Box 196, Chevak, Ak. 99563

[21] Appl. No.: 369,082

[22] Filed: Jan. 5, 1995

[51] Int. Cl.⁶ .................. B32B 3/06; B60J 11/00
[52] U.S. Cl. .................. 428/100; 428/99; 150/166; 280/770; 296/136
[58] Field of Search .................. 428/99, 100; 150/166; 280/770; 296/136

*Primary Examiner*—Alexander S. Thomas

[57] ABSTRACT

A removable protective cover for a snowmobile including a sheet sized for enclosing a cowling of a snowmobile, the sheet having a top panel with a front panel, a rear panel, and a pair of side panels extended therefrom to define a hollow interior and a common bottom edge, the top panel having a opening formed thereon and an elastic band secured thereto about the periphery of the opening for holding the sheet about a windshield of a snowmobile, the rear panel having a large lower cut out formed thereon to create a pair of opposed lower corners and a small upper cut out extended upwards from the lower cut out to create a pair of upper corners, an upper rear edge extended between the upper corners, and a pair of opposed lower rear edges, the sheet further having a cable with an end located near an upper corner, another end located near the other upper corner, and an intermediate portion therebetween coupled to the lower rear edges and the bottom edge, and a cable securement mechanism for securing the ends of the cable in a closed loop configuration.

8 Claims, 4 Drawing Sheets

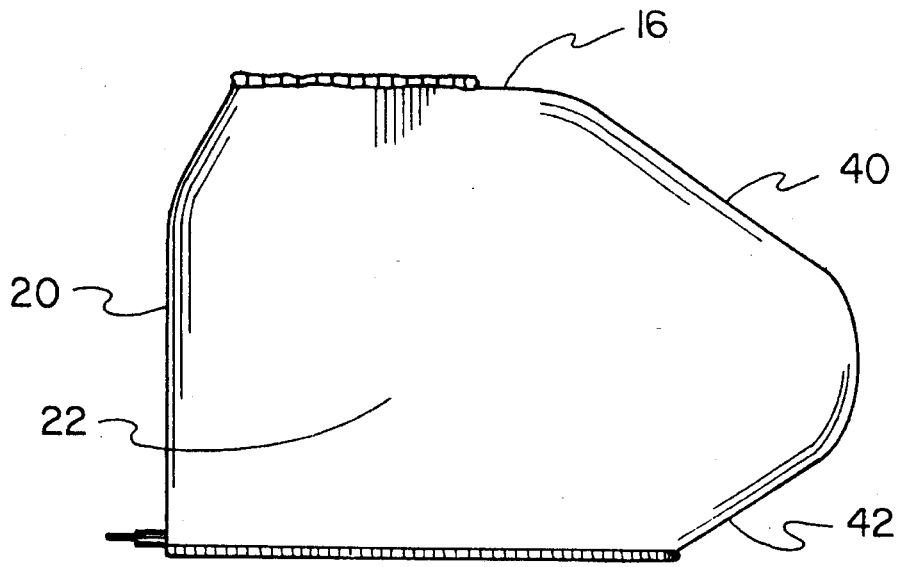
FIG. 6
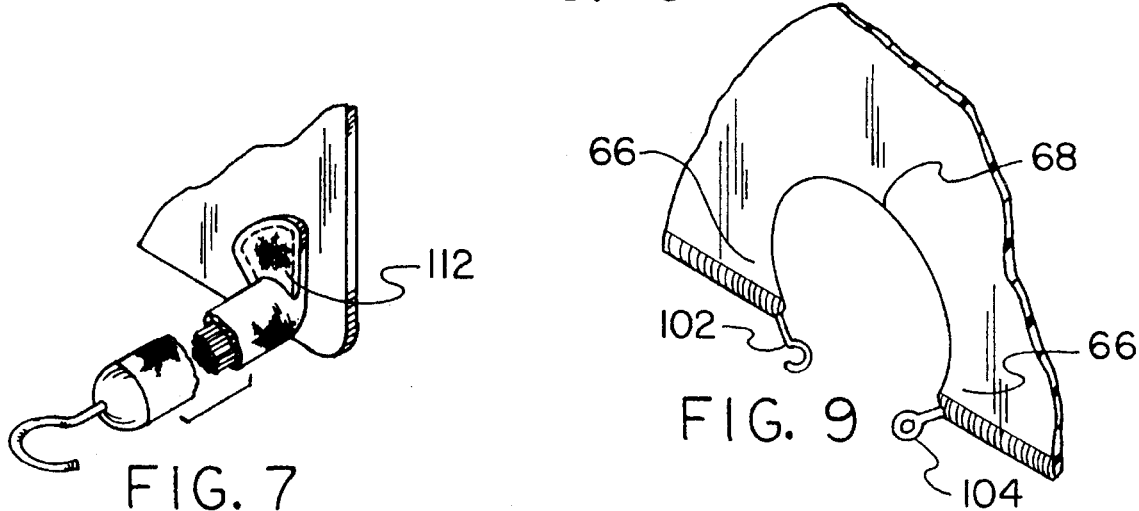
FIG. 7
FIG. 9
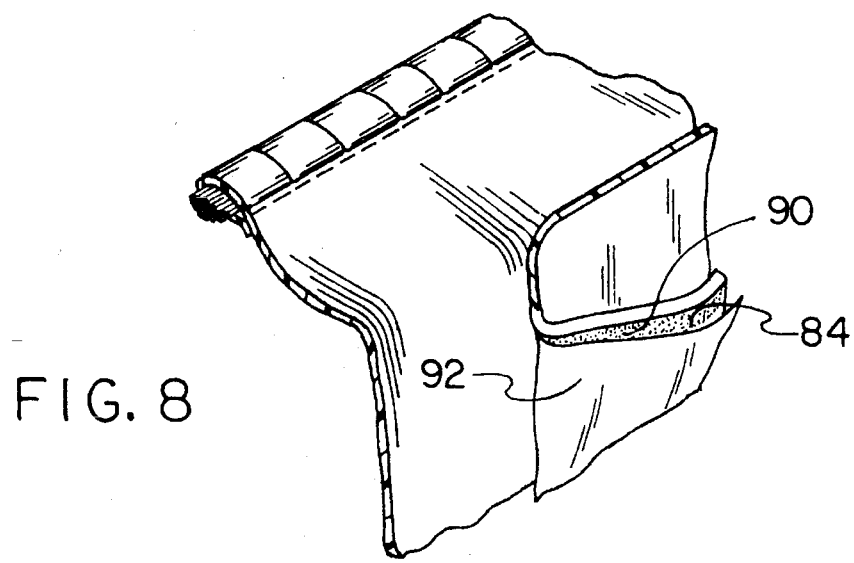
FIG. 8

REMOVABLE PROTECTIVE COVER FOR A SNOWMOBILE

BACKGROUND OF THE INVENTION

1. Field of the Invention

The present invention relates to a removable protective cover for a snowmobile and more particularly pertains to preventing snow from accumulating in an engine compartment of a snowmobile with a removable protective cover for a snowmobile.

2. Description of the Prior Art

The use of covers is known in the prior art. More specifically, covers heretofore devised and utilized for the purpose of protecting a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 3,721,467 to Kerr discloses a molded plastic cover to enclose a snowmobile on a trailer. U.S. Pat. No. 4,789,574 to Selbay discloses a removable protective liner for vehicles. U.S. Pat. No. 5,056,817 to Fuller discloses a temperature-rise limiting automobile bra. U.S. Pat. No. 5,275,460 to Kraus discloses a motor vehicle protective cover. U.S. Pat. No. 5,280,989 to Castillo discloses a static cling vinyl halter-type cover for vehicle front protection.

While these devices fulfill their respective, particular objective and requirements, the aforementioned patents do not describe a removable protective cover for a snowmobile that protects snow from accumulating in an engine compartment of a snowmobile.

In this respect, the removable protective cover for a snowmobile according to the present invention substantially departs from the conventional concepts and designs of the prior art, and in doing so provides an apparatus primarily developed for the purpose of preventing snow from accumulating in an engine compartment of a snowmobile.

Therefore, it can be appreciated that there exists a continuing need for new and improved removable protective cover for a snowmobile which can be used for preventing snow from accumulating in an engine compartment of a snowmobile. In this regard, the present invention substantially fulfills this need.

SUMMARY OF THE INVENTION

In the view of the foregoing disadvantages inherent in the known types of covers now present in the prior art, the present invention provides an improved removable protective cover for a snowmobile. As such, the general purpose of the present invention, which will be described subsequently in greater detail, is to provide a new and improved removable protective cover for a snowmobile and method which has all the advantages of the prior art and none of the disadvantages.

To attain this, the present invention essentially comprises, in combination, a waterproof durable sheet of fabric sized to protectively enclose a cowling of a snowmobile. The sheet has a generally horizontal top panel with a front panel, a rear panel, and a pair of opposed side panels extended peripherally downwards therefrom to define a hollow interior and with the front panel, rear panel, and side panels terminated at a common bottom edge to thereby create an opening for allowing access to the interior.

The top panel has a generally trapezoidal-shaped central top opening formed thereon and an elastic band secured thereto about the periphery of the top opening for holding the sheet in a stationary position about a windshield of a snowmobile. The front panel has a downwardly angled top section and an upwardly angled bottom section. The top section of the front panel includes a generally rectangular front vent hole formed thereon having a top edge, a bottom edge, and side edges extended therebetween. The top section further includes a central flap having a exterior surface, a interior surface, and a periphery interconnecting the exterior surface to the interior surface formed of a top edge sewn to the top section at a location adjacent to the top edge of the front vent hole, a bottom edge, and a pair of opposed side edges extended therebetween and with the flap further having strips of complimentary pile-type fastener sewn to the interior surface near the front and side edges. The top section additionally includes strips of complimentary pile-type fastener sewn thereto adjacent to the front edge and side edges of the front vent hole and with the strips of the flap and top section securable with each other to prevent access to the interior.

The rear panel has a generally rectangular lower cut out formed centrally thereon to create a pair of opposed lower corners and a generally arcuate central upper cut out formed thereon and extended upwards from the lower cut out to create a pair of upper corners, an upper rear edge extended between the upper corners, and a pair of opposed lower rear edges. Each rear edge is extended between an upper corner and a corresponding lower corner therebelow and with the upper cut out adapted for receiving a yoke of a set of handle bars of a snowmobile therein. The rear panel further has a U-shaped slit thereon with a zipper sewn thereover. The zipper is openable for allowing access to the interior and closeable for preventing such access.

Each side panel has a generally rectangular side vent hole thereon. Each side vent hole has a long top edge, a long bottom edge, and a pair of opposed side edges extended therebetween. Each side panel further has a rectangular flap with an exterior surface, an interior surface, a long top edge sewn to the side panel at a location above the top edge of a side vent hole, a bottom long edge, and a pair of side edges extended therebetween. Each flap has strips of pile-type fastener sewn to the interior surface along the side edges and bottom edges thereof. Each side panel further has strips of complimentary pile-type fastener sewn thereto about the bottom edge and side edges of each vent hole. The strips on a side panel and associated flap are securable with each other to prevent access to the interior.

The sheet includes an elastic strap. The strap has a hook at one end located near an upper corner, a loop at the other end located near the other upper corner, and an intermediate portion therebetween sewn to the lower rear edges and the bottom edge. The hook is removably securable to the loop for securing the strap in a closed loop configuration to a cowling of a snowmobile.

Lastly, a pair of cables are included. Each cable has a base end coupled to an upper corner of the rear panel and a hook end extended therefrom. Each hook is used for coupling with a frame of a snowmobile for holding the sheet in a stationary position.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved removable protective cover for a snowmobile which has all the advantages of the prior art covers and none of the disadvantages.

It is another object of the present invention to provide a new and improved removable protective cover for a snowmobile which may be easily and efficiently manufactured and marketed.

It is a further object of the present invention to provide a new and improved removable protective cover for a snowmobile which is of durable and reliable construction.

An even further object of the present invention is to provide a new and improved removable protective cover for a snowmobile which is susceptible of a low cost of manufacture with regard to both materials and labor, and which accordingly is then susceptible of low prices of sale to the consuming public, thereby making such a removable protective cover for a snowmobile economically available to the buying public.

Still yet another object of the present invention is to provide a new and improved removable protective cover for a snowmobile which provides in the apparatuses and methods of the prior art some of the advantages thereof, while simultaneously overcoming some of the disadvantages normally associated therewith.

Even still another object of the present invention is to provide a new and improved removable protective cover for a snowmobile for preventing snow from accumulating in an engine compartment of a snowmobile.

Lastly, it is an object of the present invention to provide a new and improved removable protective cover for a snowmobile comprising a sheet sized to enclose a cowling of a snowmobile, the sheet having a top panel with a front panel, a rear panel, and a pair of side panels extended downwards therefrom to define a hollow interior and a common bottom edge, the top panel having a opening formed thereon and an elastic band secured thereto about the periphery of the opening for holding the sheet in a stationary position about a windshield of a snowmobile, the rear panel having a large lower cut out formed thereon to create a pair of opposed lower corners and a small upper cut out extended upwards from the lower cut out to create a pair of upper corners, an upper rear edge extended between the upper corners, and a pair of opposed lower rear edges, the sheet further having a cable with an end located near an upper corner, another end located near the other upper corner, and an intermediate portion therebetween coupled to the lower rear edges and the bottom edge, and cable securement means for securing the ends of the cable in a closed loop configuration.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a side-elevational view of the alternate embodiment of the present invention shown in FIG. 4.

FIG. 7 is an enlarged view of a cable of the present invention.

FIG. 8 is an enlarged view of a side vent hole of the present invention.

FIG. 9 is an enlarged view of the cable used for securing the present invention to a snowmobile.

The same reference numerals refer to the same parts through the various Figures.

DESCRIPTION OF THE PREFERRED EMBODIMENT

Figure 1:
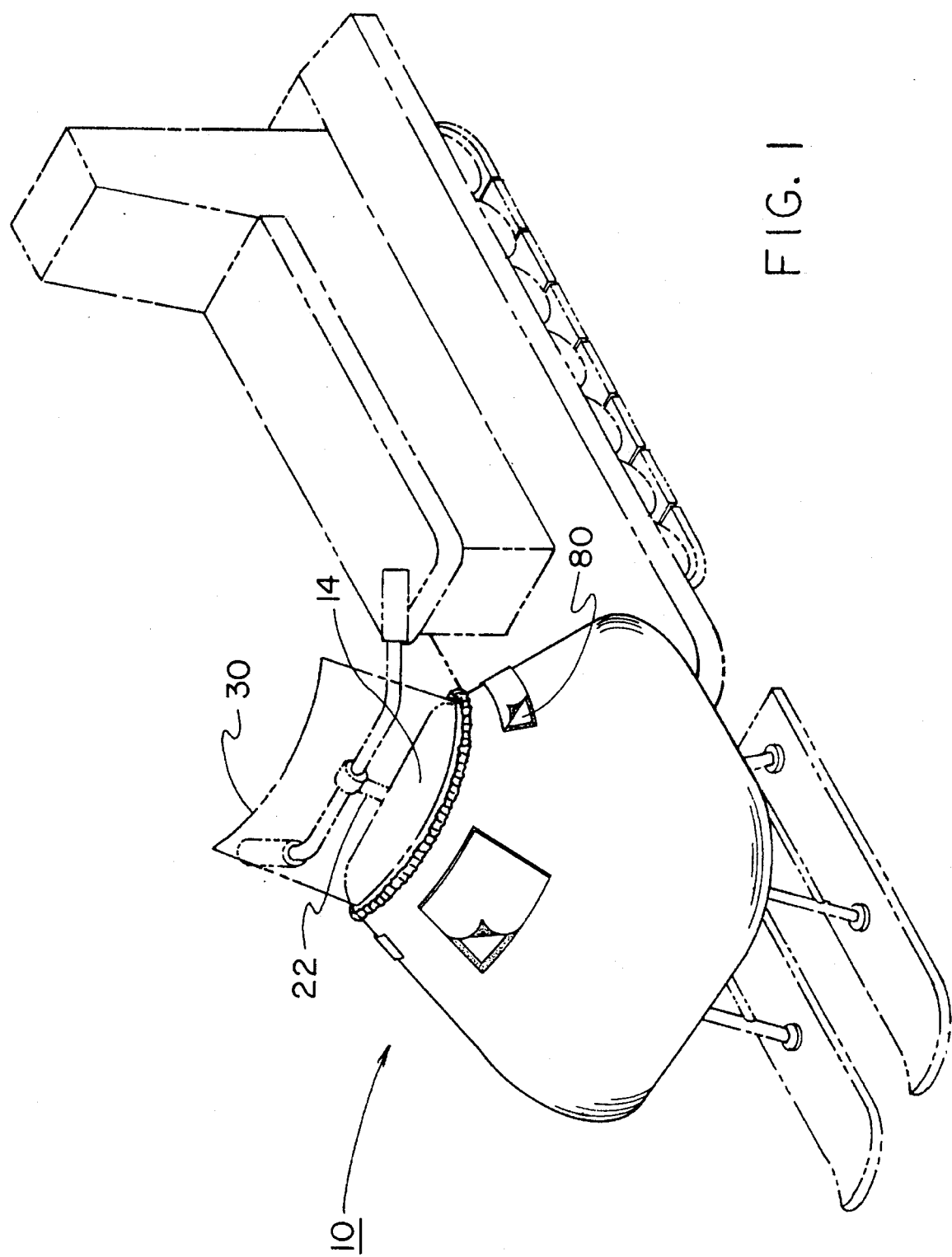
FIG. 1 is a perspective view of the preferred embodiment constructed in accordance with the principles of the present invention secured upon and in contact with the cowling of a snowmobile.
Figure 2:
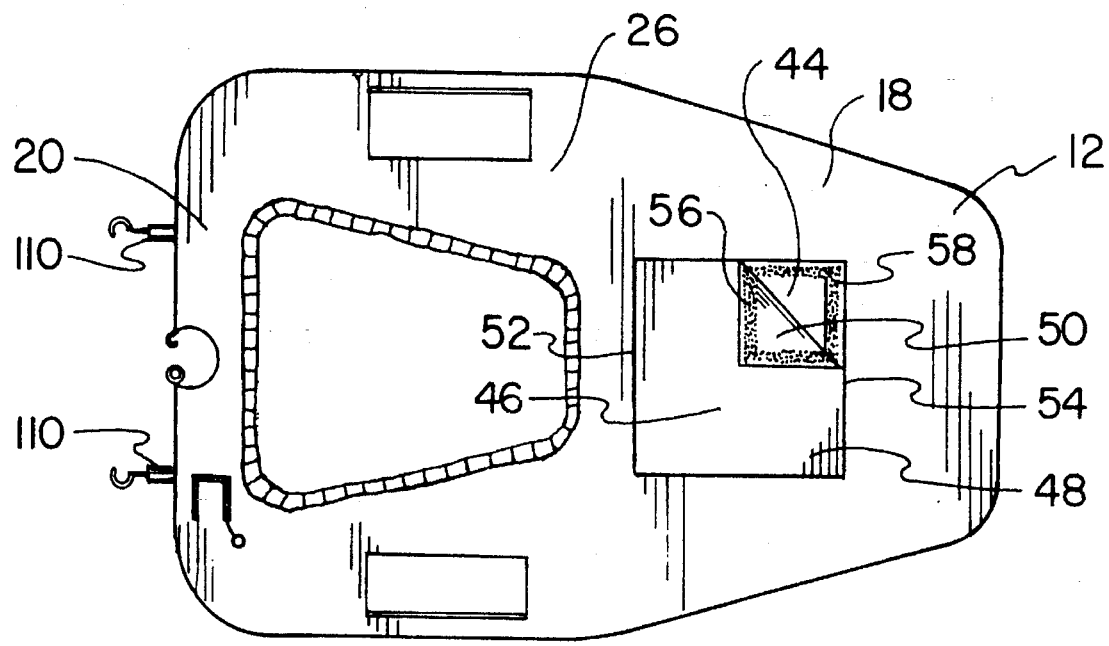
FIG. 2 is a plan view of the present invention de-coupled from the cowling of a snowmobile.
Figure 3:
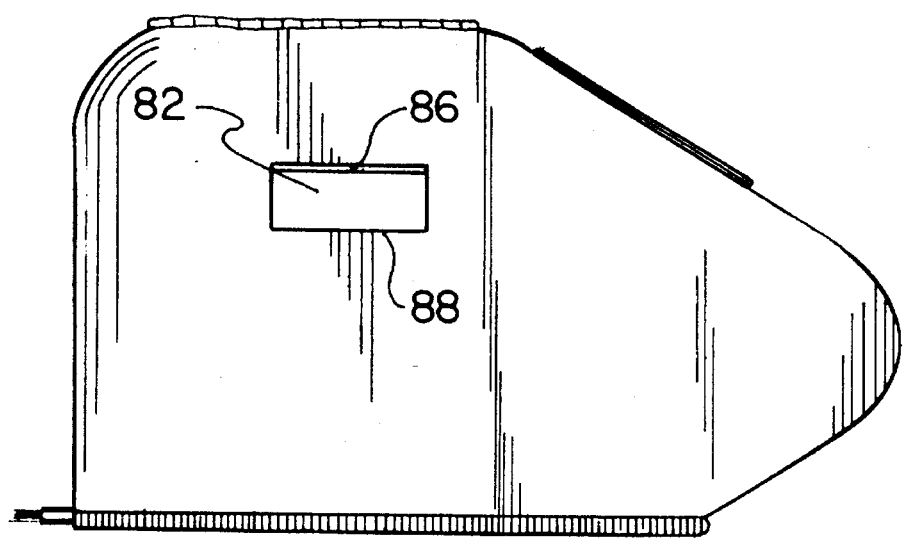
FIG. 3 is a side-elevational view of the preferred embodiment of the present invention.

With reference now to the drawings, and in particular, to FIG. 1 thereof, the preferred embodiment of the new and improved removable protective cover for a snowmobile embodying the principles and concepts of the present invention and generally designated by the reference number 10 will be described.

The present invention is comprised of a plurality of components. In their broadest context, such components include a sheet with vent holes and flaps, a strap, and a pair of cables. Such components are individually configured and correlated with respect to each other to provide the intended function of preventing snow from accumulating in an engine compartment of a snowmobile.

Specifically, the present invention includes a water-proof durable sheet of fabric or elastomeric material sized to protectively enclose and snugly fit a cowling 14 of a snowmobile. The sheet includes a generally horizontal and rectangular top panel 16. Also included is a front panel 18, a rear panel 20 and a pair of opposed side panels 22. The front panel, rear panel, and opposed side panels are extended peripherally downwards from the top panel to thereby define a hollow interior. The front panel, rear panel, and side panels are terminated at a common bottom edge 24. Their termination creates an opening for allowing access to the interior.

The top panel 16 has a generally trapezoidal-shaped central top opening 26 formed thereon. Furthermore, as elastic band 28 is secured around the periphery of the top opening. The band is formed of a plurality of elastic strands bound together as shown in FIG. 8. This band is used for snugly holding the sheet in a stationary position about a windshield 30 of a snowmobile as shown in FIG. 1. The strap thus precludes the sheet from moving or becoming dislodged when the snowmobile is in motion.

The front panel 18 has a downwardly angled top section 40 and an upwardly angled bottom section 42. When secured to the cowling of a snowmobile, a rounded intermediate section is formed between the top section and the bottom section as shown in FIG. 6. The front panel also includes a generally rectangular front vent hole 44 formed thereon. The front vent hole has a top edge, a bottom edge, and side edges extended therebetween. The top section also includes a central flap 46. The flap has an exterior surface 48, an interior surface 50, and a periphery interconnecting the surfaces. The periphery is formed of a top edge 52 sewn to the top section at a location adjacent to the top edge of the front vent hole 44, a bottom edge 54, and a pair of opposed side edges extended therebetween. The flap further has strips of pile-type fastener 56 sewn to the interior surface near the front and side edges to create a border. The top section additionally includes strips of complimentary pile-type fastener 58 sewn thereto adjacent to the front edge and side edge of the front vent hole to create another border. The borders are securable with each other to prevent access to the interior. Furthermore, the borders may be unsecured for allowing the interior to be ventilated.

Figure 4:
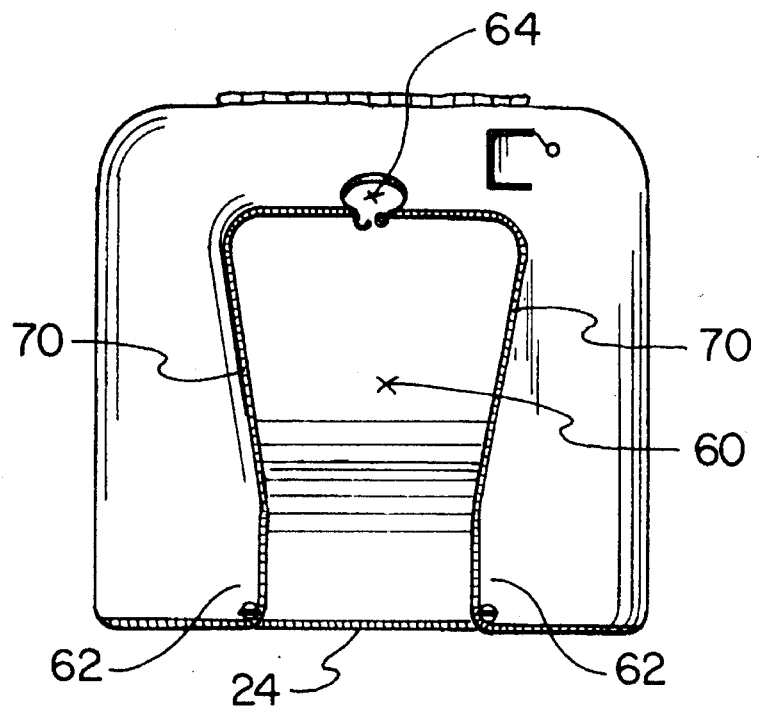
FIG. 4 is a rear view of the preferred embodiment of the present invention.

The rear panel 20 has a generally rectangular lower cut out 60 formed centrally thereon. This lower cut out 60 creates a pair of opposed lower corners 62. Furthermore, a generally arcuate central upper cut out 64 is formed on the rear panel and extended upwards from the lower cut out to create a pair of upper corners 66, an upper rear edge 68 extended between the upper corners, and a pair of opposed lower rear edges 70. Each rear edge is extended between an upper corner and a corresponding lower corner therebelow as shown in FIG. 4. The upper cut out is adapted for receiving a yoke 72 of a set of handle bars of a snowmobile therein. The rear panel further has a U-shaped slit thereon with a zipper 74 sewn thereover. The zipper is openable for allowing access to the interior for manipulating a key and choke of a snowmobile. The zipper is further closable for preventing access to the control mechanisms of a snowmobile.

Each side panel has a generally rectangular side vent hole 80 formed thereon. The side vent holes are smaller than the from vent hole. The side vent holes are positioned in symmetric opposition on each side panel. Each side vent hole has a long top edge, a long bottom edge, and a pair of opposed side edges extended therebetween.

Each side panel further includes a rectangular flap 82. The flap has an exterior surface, an interior surface 84, and a periphery therearound. The periphery consists of a long top edge 86 sewn to a side panel at a location above the top edge of a side vent hole, a bottom long edge 88, and a pair of side edges extended therebetween. Each flap on a side panel has strips of pile-type fastener 90 sewn to the interior surface thereof along the side edges and bottom edges to define a border. Each side panel further has strips of complimentary pile-type fastener 92 sewn thereto about the bottom edge and side edges of each vent hole to create another border. The borders on the side panel and associated flap are securable with each other to prevent access to the interior. Furthermore, the borders may be unsecured from each other for allowing the interior to be ventilated.

Also included is an elastic strap 100. The elastic strap has a hook 102 at one end coupled to an upper corner, a loop at the other end coupled to the other upper corner, and an intermediate portion therebetween sewn to the lower rear edges 70 and the bottom edge 24. The hook is removably securable to the loop to place the strap in a closed loop configuration for securing the sheet tightly to a cowling of a snowmobile as shown in FIG. 1.

Lastly, a pair of cables 110 is included. Each cable has a base end 112 coupled to the upper corner of the rear panel of the sheet and a hook end 114 extended therefrom. Each cable is coupleable to a frame of a snowmobile. The cable is formed of a plurality of elastic strands bound together and coated with a plastic sheath.

Figure 5:
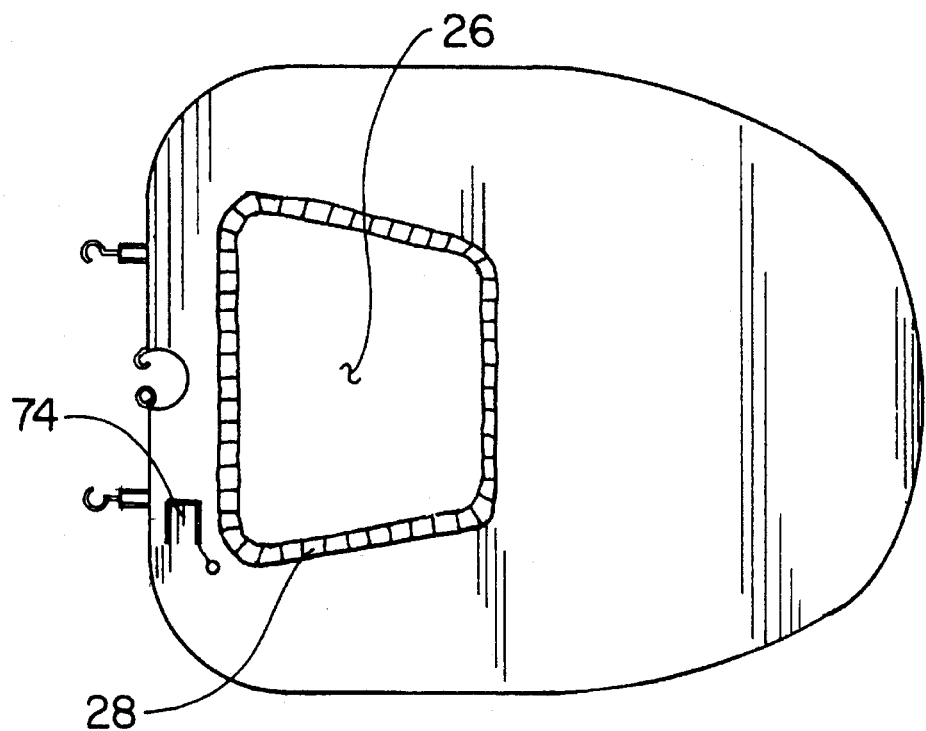
FIG. 5 is a plan view of an alternate embodiment of the present invention.

A second embodiment of the present invention is shown in FIGS. 5 and 6. In this embodiment, the flaps and vent holes are not included. This configuration is especially adaptable for use on a snowmobile that does not have vent holes on its cowling.

The present invention is a cover for a cowling of a snowmobile prevent snow from getting into the engine compartment. If snow happens to enter an engine compartment, it ultimately melts and then refreezes, causing the steering of a snowmobile to freeze, and thereby hindering its operability. The present invention is made from a type of fabric used to make similar covers for protecting motorized equipment from severe weather. Plastic sheeting, canvas sheeting, or the like can be utilized. The present invention is custom-shaped to fit the cowling of a snowmobile according to the model of snowmobile for which it is intended. Looking at the present invention from the top, the cover is wide in the back where it fits over the windshield and headlight of a snowmobile, then its sides run parallel to each other for a short length and taper inwardly slightly to the front. A large opening for the windshield, speedometer, tachometer and headlight is situated from its approximate middle to near its rear. Hooks positioned strategically on a center rear opening secure the cover to the machine. Rectangular air vents with covers are located on its two sides and its front. The unit is held in place with a hook and loop fastener. A zippered pocket for access to the ignition key and choke is located in its rear area. Elastic bands are sewn into all its edges and the edges of the windshield are cut out to secure it tightly to the cowling. The present invention is stretched over a cowling of a snowmobile whenever desired, especially during snow storms or when there is blowing snow. The air vents are covered or left open depending on the need. The present invention effectively prevents snow from getting into the engine compartment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A removable protective cover for a snowmobile comprising, in combination:

a waterproof durable sheet of fabric sized to protectively enclose a cowling of a snowmobile, the sheet having a generally horizontal top panel with a front panel, a rear panel, and a pair of opposed side panels extended peripherally downwards therefrom to define a hollow interior and with the front panel, rear panel, and side panels terminated at a common bottom edge to thereby create an opening for allowing access to the interior, the top panel having a generally trapezoidal-shaped central top opening formed thereon and an elastic band secured thereto about the periphery of the top opening for holding the sheet in a stationary position about a windshield of a snowmobile, the front panel having a downwardly angled top section and an upwardly angled bottom section, the top section thereof including a generally rectangular front vent hole formed thereon having a top edge, a bottom edge, and side edges extended therebetween, the top section further including a central flap having a exterior surface, a interior surface, and a periphery interconnecting the exterior surface to the interior surface formed of a top edge sewn to the top section at a location adjacent to the top edge of the front vent hole, a bottom edge, and a pair of opposed side edges extended therebetween and with the flap further having strips of complimentary pile-type fastener sewn to the interior surface near the front and side edges, the top section additionally including strips of complimentary pile-type fastener sewn thereto adjacent to the front edge and side edges of the front vent hole and with the strips securable with each other to prevent access to the interior, the rear panel having a generally rectangular lower cut out formed centrally thereon to create a pair of opposed lower corners and a generally arcuate central upper cut out formed thereon and extended upwards from the lower cut out to create a pair of upper corners, an upper rear edge extended between the upper corners, and a pair of opposed lower rear edges with each rear edge extended between an upper corner and a corresponding lower corner therebelow and with the upper cut out adapted for receiving a yoke of a set of handle bars of a snowmobile therein, each upper corner of the rear panel having a cable with a base end secured thereto and a hook end extended therefrom and coupleable to a frame of a snowmobile, the rear panel further having a U-shaped slit thereon with a zipper sewn thereover and with the zipper openable for allowing access to the interior and closeable for preventing such access, each side panel having a generally rectangular side vent hole thereon, each side vent hole having a long top edge, a long bottom edge, and a pair of opposed side edges extended therebetween, each side panel further having a rectangular flap with an exterior surface, an interior surface, a long top edge sewn thereto at a location above the top edge of a side vent hole, a bottom long edge, and a pair of side edges extended therebetween, each flap having strips of pile-type fastener sewn to the interior surface along the side edges and bottom edges thereof, each side panel further having strips of complimentary pile-type fastener sewn thereto about the bottom edge and side edges of each vent hole and with the strips on a side panel and associated flap securable with each other to prevent access to the interior;

an elastic strap with a hook at one end located near an upper corner, a loop at the other end located near the other upper corner, and an intermediate portion therebetween sewn to the lower rear edges and the bottom edge of the sheet and with the hook removably securable to the loop to place the strap in a closed loop configuration for securing the sheet to a cowling of a snowmobile; and a pair of cables with each cable having a base end coupled to an upper corner of the rear panel of the sheet and a hook end extended therefrom for coupling with a frame of a snowmobile.

2. A removable protective cover for a snowmobile comprising, in combination:

a sheet sized to enclose a cowling of a snowmobile, the sheet having a top panel with a front panel, a rear panel, and a pair of side panels extended downwards therefrom to define a hollow interior and a common bottom edge, the top panel having a opening formed thereon and an elastic band secured thereto about the periphery of the opening for holding the sheet in a stationary position about a windshield of a snowmobile, the rear panel having a large lower cut out formed thereon to create a pair of opposed lower corners and a small upper cut out extended upwards from the lower cut out to create a pair of upper corners, an upper rear edge extended between the upper corners, and a pair of opposed lower rear edges, the sheet further having a cable with an end located near an upper corner, another end located near the other upper corner, and an intermediate portion therebetween coupled to the lower rear edges and the bottom edge, and cable securement means for securing the ends of the cable in a closed loop configuration.

3. The removable protective cover for a snowmobile as set forth in claim 2 wherein the opening is trapezoidal-shaped.

4. The removable protective cover for a snowmobile as set forth in claim 2 wherein the front panel has a downwardly angled top section and an upwardly angled bottom section.

5. The removable protective cover for a snowmobile as set forth in claim 2 wherein the front panel includes a vent hole formed thereon, a flap coupled to the front panel adjacent to the vent hole and positionable thereover, and coupling means for securing the flap over the vent hole.

6. The removable protective cover for a snowmobile as set forth in claim 2 wherein the rear panel includes a slit formed thereon with a zipper coupled thereover and with the zipper openable for allowing access to the interior and closeable for preventing such access.

7. The removable protective cover for a snowmobile as set forth in claim 2 wherein each side section includes a vent hole formed thereon, a flap coupled to each side section adjacent to the vent hole and positionable thereover, and coupling means for securing each flap over the associated vent hole.

8. The removable protective cover for a snowmobile as set forth in claim 2 a pair of cables with each cable having a base end secured to the rear panel and a hook end extended therefrom and coupleable to a frame of a snowmobile.

* * * * *